United States Patent [19]
Meijer

[11] Patent Number: 5,025,534
[45] Date of Patent: Jun. 25, 1991

[54] DEVICE FOR THE POSITIONAL ORIENTATION OF THE CHEST STRAP OF A THREE-POINT SEAT BELT

[75] Inventor: Nils E. Meijer, Laholm, Sweden

[73] Assignee: Scafix AB, Halmstad, Sweden

[21] Appl. No.: 382,648

[22] PCT Filed: Dec. 4, 1987

[86] PCT No.: PCT/SE87/00579
§ 371 Date: Aug. 8, 1989
§ 102(e) Date: Aug. 8, 1989

[87] PCT Pub. No.: WO88/04622
PCT Pub. Date: Jun. 30, 1988

[30] Foreign Application Priority Data
Dec. 16, 1986 [SE] Sweden ............................ 8605395

[51] Int. Cl.[5] ..................... A44B 11/00; A47D 15/00
[52] U.S. Cl. ...................................... 24/172; 24/200; 297/484
[58] Field of Search .............. 24/172, 200, 196, 197; 297/475, 476, 483, 484

[56] References Cited
U.S. PATENT DOCUMENTS

| | | | |
|---|---|---|---|
| 47,288 | 4/1865 | Fassmann | 24/200 |
| 837,103 | 11/1906 | Nonnemacher | 24/200 |
| 2,278,153 | 3/1942 | Shaulson | 24/200 |
| 3,473,201 | 10/1969 | Hopka et al. | 297/483 |
| 4,109,935 | 8/1978 | Weman | 297/483 |
| 4,309,799 | 1/1982 | Noda | 24/200 |
| 4,540,218 | 9/1985 | Thomas | 297/484 |

FOREIGN PATENT DOCUMENTS 7111066-2  3/1975  Sweden .

*Primary Examiner*—Victor N. Sakran
*Attorney, Agent, or Firm*—Beveridge, DeGrandi & Weilacher

[57] ABSTRACT

The chest strap of a three-point safety belt of a vehicle is positioned, particularly for small passengers, by a substantially triangular plate with two elongated slots which lie at an acute angle with respect to each other. One slot has an upwardly directed open end for receiving the chest strap. By moving the device along the abdomen strap, the position of the chest strap across the wearer's chest can be adjusted.

12 Claims, 3 Drawing Sheets

Fig. 5.
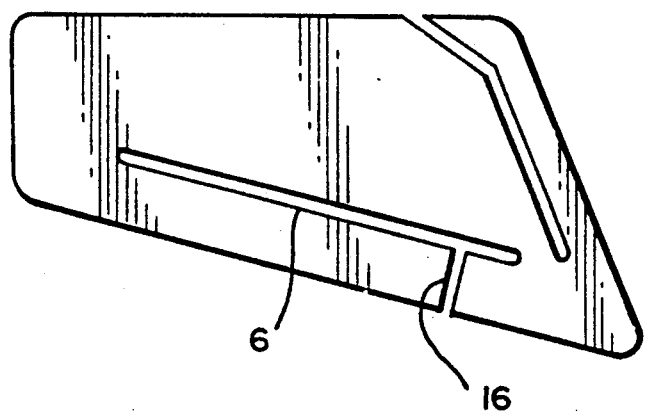
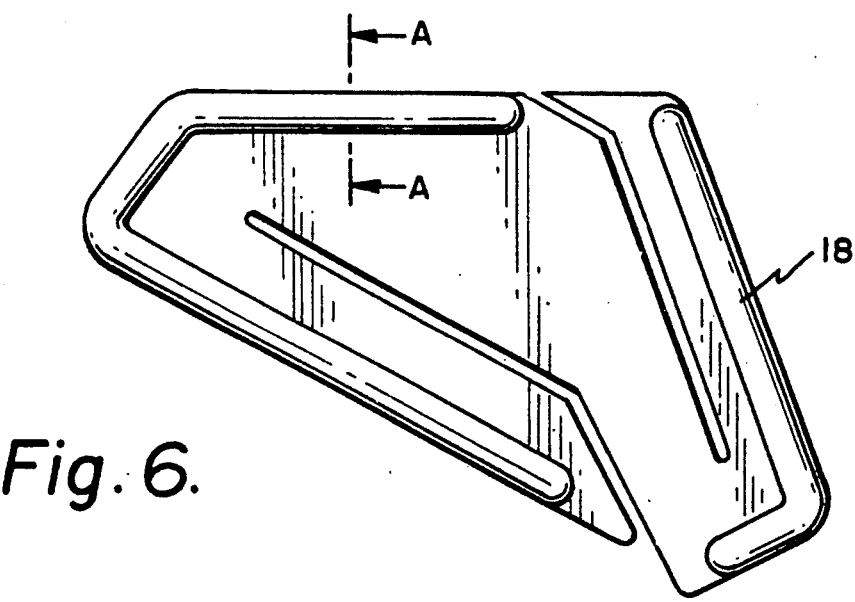
Fig. 6.
Fig. 7.
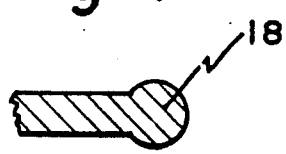

DEVICE FOR THE POSITIONAL ORIENTATION OF THE CHEST STRAP OF A THREE-POINT SEAT BELT

TECHNICAL FIELD

The present invention relates to a device for the positional orientation of a chest strap in a so-called three-point seat belt.

BACKGROUND ART

Three-point seat belts for motor vehicles occur generally and comprise essentially a strap which crosses the lower abdomen of the wearer and a strap which runs diagonally across the chest and rib-cage of the wearer. On one side of the wearer, the two straps have a common anchorage point is a region which is oriented beside the hip of the wearer. On the other side of the wearer, the straps display different anchorage points, and the abdomen, or lap strap has, on this side, a lower anchorage point, which is placed beside the other hip of the wearer, and the chest strap a higher anchorage point which is placed just above the wearer's shoulder. When a person using the belt is of average or greater height, the chest strap runs diagonally from the upper anchorage point across the shoulder and chest and down towards the hip, to the common anchorage point. However, problems arise when the wearer of the belt is of short stature. In this situation, the chest strap shows a marked tendency to lie across the wearer's neck and, if the wearer is of extremely short stature, the chest strap may even mask across the wearer's face.

The above-outlined problems have been previously solved by a number of different prior art means. One has been to arrange the upper anchorage point at a block which is slidably journalled in a vertically anchored guide, the block being securable in a number of different vertical positions in the guide. Hereby, the orientation of the chest strap—when the belt wearer is of short stature—has been arranged such that the upper anchorage point is quite simply lowered. Swedish Printed Application No. 7111066-2 discloses a further solution which entails that the chest and abdomen straps are, at their ends towards the common anchorage point, passed through an elongate sleeve which, thus, brings together the chest and abdomen straps to a common point of intersection at such a position on the body of the wearer that the chest strap assumes a position entailing that the straps does not cross the neck region of the wearer.

These prior art solutions have proved to suffer from a number of drawbacks. For example, the prior art solution in which a slidably journalled block is journalled in is guide a expensive in its manufacture and mounting in a vehicle, and is, moreover, extremely restricted in its scope of use. The solution employing an elongate sleeve through which the chest and abdomen straps are jointly passed is not adjustable and, hence, unsuitable, since the belt might be used by wearers of different heights.

SOLUTION

The present invention obviates the above-outlined problems and drawbacks by proposing a device which is characterised by a figure-shaped plate with first and second mutually angled slots for sliding engagement with the chest and abdomen straps of the belt, respectively, in which the first slot is in engagement with the abdomen strap and the second slot is in engagement with the chest strap; and that the orientation of the chest strap across the chest and ribcage of the wearer is determined by the positional fixation of the first slot on the abdomen strap.

BRIEF DESCRIPTION OF THE ACCOMPANYING DRAWINGS

The nature of the present invention and its aspects will be more readily understood from the following brief description of the accompanying Drawings, and discussion relating thereto.

In the accompanying Drawings:

FIG. 5 illustrates a further alternative embodiment of the device according to the present invention;

FIG. 6 illustrates yet a further embodiment of the device according to the present invention; and FIG. 7 is a cross-section of the device according to the present invention taken along the line A—A in FIG. 6.

DESCRIPTION OF PREFERRED EMBODIMENT

Figure 2:
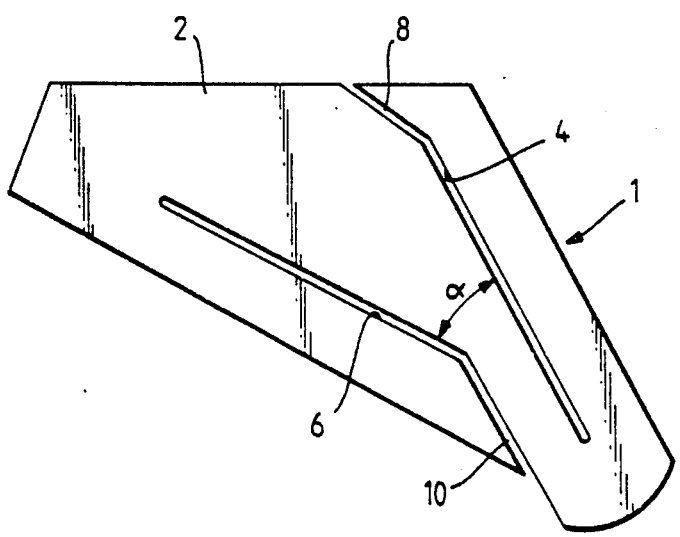
FIG. 2 is a top plan view of the device according to the present invention.
Figure 3:
FIG. 3 is a side elevation of the device according to the present invention.

Referring to the Drawings, FIG. 2 shows the device 1 according to the present invention seen from above. It will be apparent from this Figure that the device consists of a substantially triangular plate 2 with two elongate slots 4, 6, opening in the outer circumference of the plate 2 and being, here, oriented in an angular relationship to one another and intended to be in slidable engagement with the chest and abdomen straps, respectively, of a three-point seat belt. As will be apparent from the Figure, the slots are angled approaching their respective opening ends, these angles 8, 10, being intended to serve as locking means for the straps inserted in the slots. As shown in FIG. 3, the cross-section of the plate is substantially rectangular. The angle of the slots in relation to one another is not of a critical nature, but a preferred angular relationship is between 30° and 70°. Preferably, the angle is about 45°.

Figure 4:
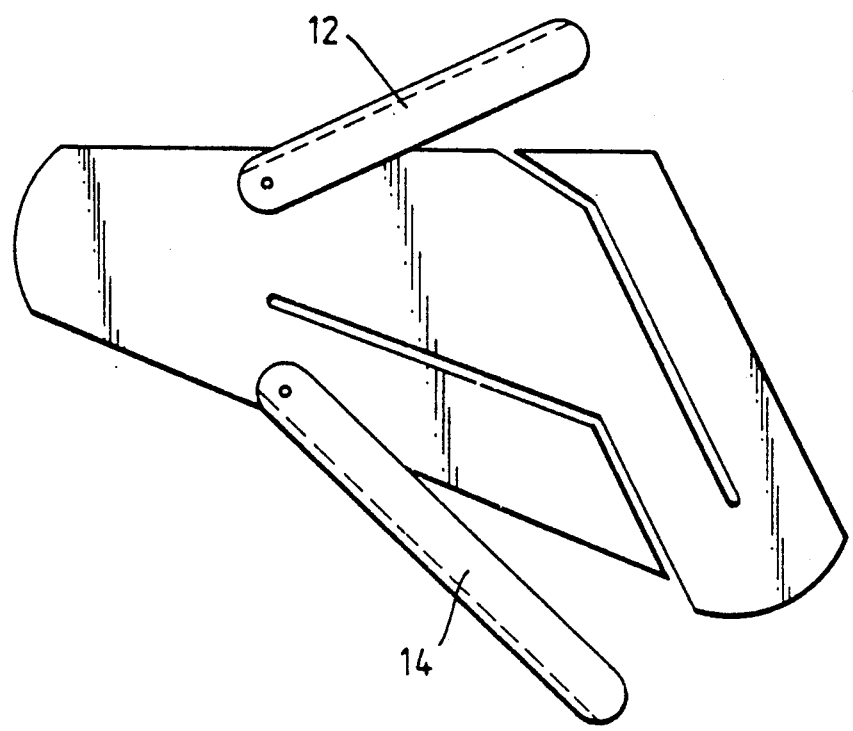
FIG. 4 illustrates an alternative embodiment of the device according to the present invention.

FIG. 4 shows an alternative embodiment of the present invention in which two arched tongues 12, 14, are pivotally disposed on the plate 2 in such a manner that they can be closed across the slot openings 8 and 10, and torsionally rigidify the plate 2, since this is exposed to extreme torsional stresses from the belts in the event of a collision.

FIG. 5 illustrates a further alternative embodiment of the device according to the present invention. In this embodiment, the slot 6 extends in parallel with the adjacent outer edge of the plate. The slot 6 is open through a third slot 16 which is transverse in relation to the slot 6, which increases the locking capability of the chest strap.

FIG. 6 illustrates a further embodiment of the device according to the present invention. This embodiment is provided with a bead 18, whose cross section is apparent from FIG. 7, the bead extending about substantially the entire outer circumference of the plate 2. The function of the bead 18 is to reinforce and stabilise the plate and to ensure a gentle angling of the belts passed through the slots in the plate.

It should here be observed that while the device according to the present invention has previously been shown as manufactured from a figure shaped plate, there is nothing to prevent the device from being manufactured from gauge wire which is bent to the configuration characteristic of the present invention.

Figure 1:
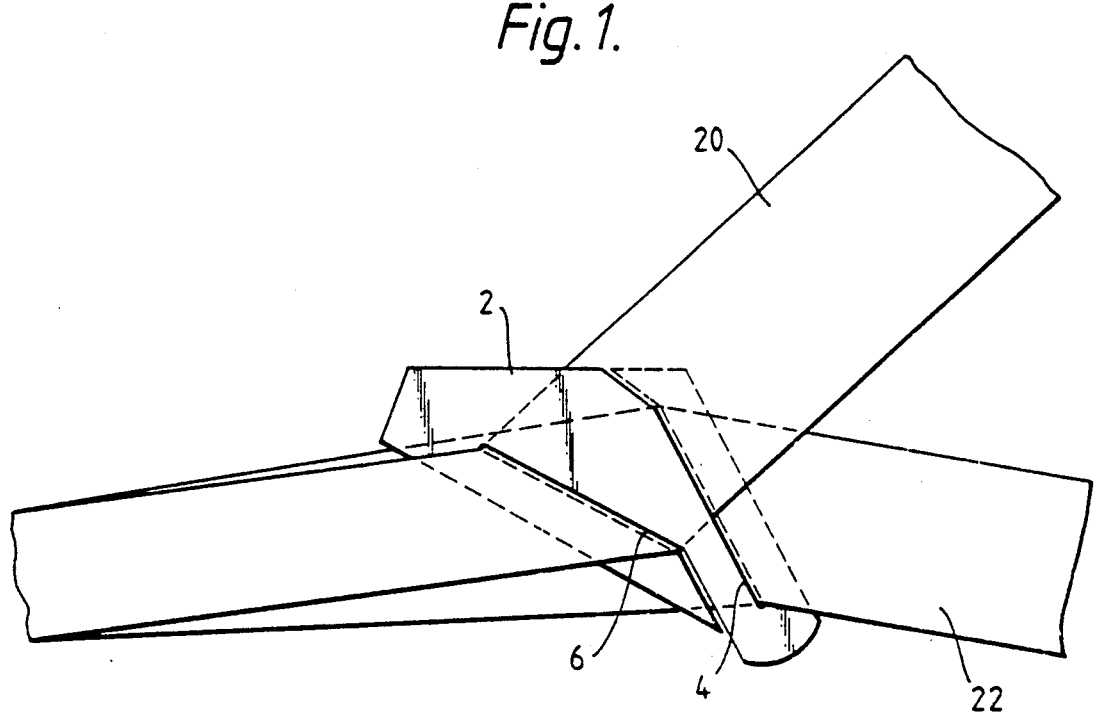
FIG. 1 shows the device according to the present invention disposed on a three-point belt.

FIG. 1 shows the device 1 anchored to a three-point belt. As will be apparent from the Drawing, the abdomen strap 22 runs in the slot 4 which is upwardly open, and the chest strap 20 runs in the slot 6 which is downwardly open. As a result, the tensioning of the individual straps, which is such that the chest strap 20 strives to move upwardly and the abdomen strap strives to move downwardly, ensures that the straps are retained in place in the slots 4 and 6.

It wil be further apparent from FIG. 1 that the inclination of the chest strap is determined by the position of the slot 4 on the abdomen strap 22. Hence, it will be obvious that if the slot 4 is moved to the right in FIG. 1 on the abdomen strap, the chest strap 20 will be at a steeper inclination, and if the slot 4 is moved to the left, the chest strap 20 will be at a more sloping inclination. Thus, the orientation of the chest strap 20 across the wearer's chest may simply be adjusted by moving the slot 4 in one or the other direction on the abdomen strap.

I claim:

1. A device for positionally orienting the chest strap of a safety belt comprising:
   a three-point safety belt having a chest strap extending across the chest of a wearer, and an abdomen strap extending over the abdomen of a wearer;
   a plate shaped member having first and second elongated slots forming an angle with one another, said first slot having an open end directed substantially upwardly, said second slot having an open end directed substantially downwardly, said abdomen strap extending through said first slot, said chest strap extending through said second slot.

2. The device as claimed in claim 1, wherein the slots are, at their open ends, angled to prevent the straps from sliding out of the slots.

3. The device as claimed in claim 2, wherein the mutual angular disposition of the slots is between 30° and 70°.

4. The device as claimed in claim 3, wherein the angle formed by the slots is approximately 45°.

5. The device as claimed in claim 2, wherein U-shaped yoke tongues are pivotally connected to the outer periphery of the plate shaped member at such a distance from the open ends of the slots that the tongues extend over the openings.

6. The device as claimed in claim 2, wherein a bead of substantially circular cross-section extends about substantially the entire periphery of the plate shaped member.

7. A device for positionally orienting the chest strap of a safety belt comprising:
   a three-point safety belt having a chest strap extending across the chest of a wearer, an abdomen strap extending over the abdomen of a wearer;
   a plate shaped member having first and second elongated slots forming an angle with one another and communicating with the periphery of said member, said first slot having at the periphery of said member an open end directed substantially upwardly when using said member, said second slot communicating with the periphery of said member via a third slot which is directed transversely of said second slot, said third slot having an open end directed substantially downwardly when using said member, said abdomen strap extending through said first slot, said chest strap extending through said second slot.

8. The device as claimed in claim 7, wherein the first slot is angled at its open end to prevent the abdomen strap from sliding out of said first slot.

9. The device as claimed in claim 8, wherein the angular disposition of the slots is between 30° and 70°.

10. The device as claimed in claim 9 wherein the angular disposition of the slots is approximately 45°.

11. The device as claimed in claim 7, wherein the third slot is located at a short distance from the lower end of the second slot.

12. The device as claimed in claim 11, wherein the angle formed by the slots is between 30° and 70° .

* * * * *